United States Patent van Doorn et al.

[11] Patent Number: 5,993,695
[45] Date of Patent: Nov. 30, 1999

[54] AQUEOUS COATING DISPERSION, PROCESS FOR THE PREPARATION THEREOF AND USE THEREOF IN ANTICORROSIVE PAINT

[75] Inventors: Markus A.M.M. van Doorn, Beek; Johan F.G.A. Jansen, Geleen, both of Netherlands

[73] Assignee: DSM N.V., Heerlen, Netherlands

[21] Appl. No.: 08/898,431

[22] Filed: Jul. 22, 1997

[30] Foreign Application Priority Data

Jul. 22, 1996 [EP] European Pat. Off. .............. 96202065

[51] Int. Cl.$^6$ .............................. H01B 1/20; B32B 15/04; B05D 5/12
[52] U.S. Cl. .................... 252/500; 428/457; 106/14.11; 106/14.41; 427/58
[58] Field of Search ............................ 252/500; 428/357, 428/375, 457; 106/14.11, 14.41; 427/58, 207.1

[56] References Cited

U.S. PATENT DOCUMENTS

| | | | |
|---|---|---|---|
| 4,007,148 | 2/1977 | Ginter et al. .................. | 260/29.6 WB |
| 4,526,706 | 7/1985 | Upson et al. ............................. | 252/500 |
| 5,415,893 | 5/1995 | Wiersma et al. ..................... | 427/385.5 |
| 5,417,890 | 5/1995 | Epron et al. ............................. | 252/500 |
| 5,700,398 | 12/1997 | Angelopoulos et al. ............... | 252/500 |
| 5,707,763 | 1/1998 | Shimizu et al. ........................ | 429/217 |
| 5,853,621 | 12/1998 | Miller et al. ............................. | 252/500 |

FOREIGN PATENT DOCUMENTS

| | | |
|---|---|---|
| 522 901 A1 | 1/1993 | European Pat. Off. . |
| 589 529 A1 | 3/1994 | European Pat. Off. . |
| 26 45 729 | 4/1978 | Germany . |

*Primary Examiner*—Mark Kopec
*Attorney, Agent, or Firm*—Pillsbury Madison & Sutro LLP

[57] ABSTRACT

The invention relates to an aqueous coating dispersion comprising at least electrically conductive particles, which particles comprise at least a first binder, a conductive polymer and a non-ionic stabilizer, characterized in that the coating dispersion contains 50 to 99 wt. %, relative to the total amount of solids present, of a second binder, which second binder does not form part of the electrically conductive particles. The invention also relates to a process for the preparation of the aqueous coating dispersion and to the use thereof in an anticorrosive paint, to the anticorrosive paint based on the aqueous coating dispersion according to the invention and to the metals protected herewith.

10 Claims, No Drawings

AQUEOUS COATING DISPERSION, PROCESS FOR THE PREPARATION THEREOF AND USE THEREOF IN ANTICORROSIVE PAINT

FIELD OF THE INVENTION

The invention relates to an aqueous coating dispersion containing electrically conductive particles, which particles contain at least a first binder, a conductive polymer and a non-ionic stabilizer.

BACKGROUND INFORMATION

Such a coating dispersion is known from EP-A-589529. The dispersion described in this patent contains electrically conductive particles in a dispersant described in EP-A-589529. The particles comprise a binder, stabilized by a non-ionic stabilizer, and an electrically conductive polymer. The dispersion of electrically conductive particles is obtained by polymerizing monomers into an electrically conductive polymer in the presence of a dispersion of binder particles stabilised by means of a non-ionic stabilizer. The binder is a thermoplastic polymer. The dispersion of electrically conductive particles described in EP-A-589529 is characterised by a homogeneous particle size. Moreover, the electrically conductive polymer is homogeneously distributed over the electrically conductive particles. The stability of the dispersion of electrically conductive particles described in EP-A 589529 is realized because the electrically conductive particles also contain a non-ionic stabilizer. Such a dispersion has been found to be very stable, even when it contains ionic compounds.

In 1981 already Mengoli et al. suggested in J. Appl. Polym. Sci. 1981, 26, 4247–4257, that conductive polymers could be used to protect metals against corrosion. However, the first positive results were obtained by Thompson only 10 years later, using a coating based on polyaniline; they were reported in Los Alamos National Report LA-UR-92-360. It was found that soft steel was protected against corrosion in salt and acid environments, even in areas where scratches were made in the coating.

The drawback of the dispersion known from EP-A-589529, however, is that the anticorrosive effect of a coating based thereon is considerably less in a damp or wet environment than in a dry environment. As metal generally corrodes in a damp environment, this can be seen as a major drawback for the application in anticorrosive paint.

SUMMARY AND OBJECTS OF THE INVENTION

The aim of the invention is to provide an aqueous coating dispersion that does not present the aforementioned drawback.

This aim is achieved according to the invention because the coating dispersion contains 50 to 99 wt. %, relative to the total amount of solids present, of a second binder, which second binder consisting of electrically non conductive particles, does not form part of the electrically conductive particles.

The aqueous coating dispersion according to the invention results in a coating based thereon that has a good anticorrosive effect in damp and wet environments. Surprisingly, it has been found that, in spite of the fact that the aqueous coating dispersion according to the invention shows no or only little electrical conductivity, it can nevertheless be used to obtain an excellent anticorrosive coating.

DETAILED DESCRIPTION OF THE INVENTION

By a 'first binder' is understood here and in the following a known dispersion of a non-doping polymer. The non-doping polymer preferably shows good coating properties. Such a polymer is for example chosen from the group comprising alkyd resins, polyester resins, amino resins, phenolic resins, polyurethane resins, epoxy resins, acrylate resins, cyclic rubbers, such as polyisoprene, natural rubber, silicone resins, polyvinyl chlorides, (poly)vinyl—esters, such as polyvinyl acetate, polyolefins, which contain for example units chosen from the group comprising ethylene, propylene, butadiene and styrene, and hydrocarbon resins, such as (co)polymers of cyclopentadiene.

The alkyd resins that can be used as first binder in the dispersion consist of, for example polyols, chosen from the group comprising glycerol, pentaerythritol, ethylene glycol, sorbitol, trimethylolethane, trimethylolpropane, dipentaerythritol, tripentaerythritol, neopentyl glycol and diethylene glycol, and polycarboxylic acids or derivatives thereof, selected from for example the group comprising phthalic anhydride, phthalic acid, isophthalic acid, maleic acid, maleic anhydride, fumaric acid, fumaric anhydride and fatty acids, such as linoleic acid and oleic acid. Possible methods for preparing the alkyd resins are known to a person skilled in the art and are described by for example H. F. Mark et al. in the Encyclopedia of Chemical Technology, 1978, Vol.2, pp. 18–50.

Suitable polyester resins consist of, for example dicarboxylic acid units or derivatives thereof, chosen from the group comprising maleic anhydride, fumaric acid, adipic acid, phthalic acid, isophthalic acid, terephthalic acid, tetrahydrophthalic acid and tetrachlorophthalic acid, and diol units, for example chosen from the group comprising 1,2-propanol, 1,3-butanol, ethylene glycol, neopentyl glycol, diethylene glycol, bisphenol-A and tricyclodecane dimethanol. Optionally use may also be made of monofunctional and/or trifunctional monomeric units. Possible methods for preparing the polyester resins are known to a person skilled in the art and are described for example by the Oil and Colour Chemists' Association, Australia in "Surface coatings, Vol.1-Raw materials and their usage", Chapman and Hall Ltd, 1983, pp. 78–87.

Suitable epoxy resins are for example derived from bisphenol-A and epichlorohydrin. Use may also be made of epoxidised aliphatic and cycloaliphatic dienes such as 3,4-epoxycyclohexylmethyl-3,4-epoxycyclohexane carboxylate and 4-epoxyethyl-1,2-epoxycyclohexane. Possible methods for preparing epoxy resins are known to a person skilled in the art and are described, for example, in Ullman's Encyclopedia of Industrial Chemistry, 1985, Vol.A9, pp. 547–563.

Suitable polyurethane resins are for example reaction products of isocyanates and polyols. The isocyanates include, for example, those from the group comprising 1,6-hexamethylenediisocyanate, polymethylene polyphenylisocyanate, 4,4'-methylenebis (phenylisocyanate), 1,5-naphthalenediisocyanate, bitolylene diisocyanate, methylene-bis(cyclohexylisocyanate), isophorone diisocyanate, trimethylhexamethylenediisocyanate, m-xylylene diisocyanate, 1,3-bis(isocyanatomethyl) cyclohexane and 1,4-bis(isocyanatomethyl)cyclohexane. The polyols are usually selected from the group comprising polyether polyols and polyester polyols. Possible methods for preparing polyurethane resins are for example described in Kirk Othmer's Encyclopedia of Chemical Technology, 1982, Vol.23, pp. 576–608.

A dispersion of a polyurethane resin can, for example, for stabilized by linking polyoxyethylene segments to the polyurethane chain, as described for example, by J. W. Rosthauser et al. in Advances in Urethane Science and Technology, 1987, Stanford, Vol.10, pp. 121–162, and by D. Dieterich in Progress in Organic Coatings, 1981, Vol.9, pp. 291–332. The segments may be composed from modified diol or isocyanate units, but it is also possible to link mono-hydroxyl-functional polyoxyethylene polyethers directly to the polyurethane chain.

Suitable amino resins are, for example reaction products of formaldehyde with compounds containing amino groups, such as melamine, benzoguanamine, glycoluril and urea. Amino resins and their preparation methods are, for example described by the Oil and Colour Chemists' Association, Australia in "Surface coatings, Vol.1-Raw materials and their usage", Chapman and Hall Ltd, 1983, pp. 87–98.

Suitable phenolic resins are, for example reaction products of a phenolic compound and an aldehyde compound, or derivatives thereof. The phenolic compound is, for example chosen from the group comprising phenol, o-cresol, 2,4-xylenol, bisphenol-A, p-phenylphenol and p-tertiary-butylphenol. The aldehyde compound is, for example formaldehyde. Phenolic resins and their preparation methods are, for example described by the Oil and Colour Chemists' Association, Australia in "Surface coatings, Vol.1-Raw materials and their usage", Chapman and Hall Ltd, 1983, pp. 99–104.

Suitable silicone resins are, for example hydrolysis products of di- or trifunctional chlorosilanes. To this end the chlorosilanes are, for example, dissolved in an organic solvent such as toluene or xylene and then hydrolyzed with water. Silicone resins can also be prepared by treating alkoxy silanes such as methoxy, ethoxy and/or propoxy silanes with a strong acid in an aqueous medium and then causing polymerization to take place. Silicone resins and their preparation methods are described, for example by the Oil and Colour Chemists' Association, Australia in "Surface coatings, Vol.1-Raw materials and their usage", Chapman and Hall Ltd, 1983, pp. 134–143.

Suitable acrylate resins are, for example prepared through homopolymerization of (meth)acrylate monomers such as methyl methacrylate, ethyl methacrylate or ethyl acrylate or through copolymerisation of these monomers with monomers that can react therewith, such as acrylonitrile, methacrylamide, maleic anhydride, aliphatic chains with a terminal acrylate group, methacrylic acid, vinyl acetate or styrene. Acrylate resins and their preparation methods are, for example described by the Oil and Colour Chemists' Association, Australia in "Surface coatings, Vol.1-Raw materials and their usage", Chapman and Hall Ltd, 1983, pp. 144–157.

The monomeric units of which the electrically conductive polymer in the dispersion of electrically conductive particles according to the invention is composed are preferably selected from the group comprising pyrrole, thiophene, indole, carbazole, furan, benzene, aniline, acetylene and derivatives of these monomers. In view of the level and the stability of the conductive properties, an electrically conductive polymer composed of pyrrole, thiophene or aniline units or derivatives of these monomers is preferable.

Examples of derivatives of these monomers are N-methylpyrrole, N-ethylpyrrole, N-n-propylpyrrole, N-n-butylpyrrole, N-phenylpyrrole, N-tolylpyrrole, N-naphthylpyrrole, 3-methylpyrrole, 3,4-dimethylpyrrole, 3-ethylpyrrole, 3-n-propylpyrrole, 3-n-butylpyrrole, 3-phenylpyrrole, 3-tolylpyrrole, 3-naphthylpyrrole, 3-methoxypyrrole, 3,4-dimethoxypyrrole, 3-ethoxypyrrole, 3-n-propoxypyrrole, 3-phenoxypyrrole, 3-methyl-N-methylpyrrole, 3-methoxy-N-methylpyrrole, 3-chloropyrrole, 3-bromopyrrole, 3-methylthiopyrrole, 3-methylthio-n-methylpyrrole, 2,2'-bithiophene, 3-methyl-2,2'-bithiophene, 3,3'-dimethyl-2,2'-bithiophene, 3,4-dimethyl-2,2'-bithiophene, 3,4-dimethyl-3',440 -dimethyl-2,2'-bithiophene, 3-methoxy-2,2'-bithiophene, 3,3'-dimethoxy-2,2'-bithiophene, 2,2',5,2''-terthiophene, 3-methyl-2,2',5',-2''-terthiophene, 3,3'-dimethyl-2,2',5',2''-terthiophene, 2-cyclohexylaniline, aniline, 4-propanoylaniline, 2-(methylamino)aniline, 2-(dimethylamine)aniline, o-toluidine, 4-carboxyaniline, n-methylaniline, m-hexylaniline, 2-methyl-4-methoxycarbonylaniline, n-propylaniline, n-hexylaniline, m-toluidine, o-ethylaniline, m-ethylaniline, o-ethoxyaniline, m-butylaniline, 5-chloro-2-ethoxy-aniline, m-octylaniline, 4-bromoaniline, 2-bromoaniline, 3-bromoaniline, 3-acetamidoaniline, 4-acetamidoaniline, 5-chloro-2-methoxy-aniline, 2-acetylaniline, 2,5-dimethylaniline, 2,3-dimethylaniline, N,N-dimethylaniline, 4-benzylaniline, 4-aminoaniline, 2-methyl-thiomethylaniline, 4-(2,4-dimethylphenyl)aniline, 2-ethylthioaniline, n-methyl-2,4-dimethylaniline, n-propyl-m-toluidine, n-methyl-o-cyanoaniline, 2,5-dibutylaniline, 2,5-dimethoxyaniline, o-cyanoaniline, tetrahydronaphthylamine, 3-(n-butane sulphonic)aniline, 2-thiomethylaniline, 2,5-dichloroaniline, 2,4-dimethoxyaniline, 3-propoxymethylaniline, 4-mercaptoaniline, 4-methylthioaniline, 3-phenoxyaniline, 4-phenoxyaniline, n-hexyl-m-toluidine, 4-phenylthioaniline, n-octyl-m-toluidine, tetrahydrobenzo [c]thiophene, 4-trimethylsilylaniline and 3,4-(alkylene-vic-dioxy-)thiophene.

Optionally the electrically conductive polymer consists of a mixture of several of the aforementioned monomeric units.

The dispersion of the first binder particles is stabilized by a non-ionic stabilizer. A non-ionic stabilizer is uncharged under the prevailing conditions. The non-ionic stabilizer can be selected from a wide range and can be either physically adsorbed (physically bound) to the binder particles or incorporated in the binder (chemically bound). The non-ionic stabilizer is for example chosen from the group comprising alkylamines, alkylamides, (ethoxylated) alkyl alcohols, alkylpyrrolidones, (ethoxylated) alkyl phenols, polyoxyalkyl esters, polyoxyalkyl ethers, glycol alkyl ethers, glycerol alkyl ethers, esters of fatty acids and (ethoxylated) sorbitanalkylates, (hydroxy(m)ethyl)cellulose, polyvinyl alcohols, polyvinyl pyrrolidones and polyacrylamides. The use of polyoxyalkyl ethers is preferred on account of their great effectiveness. Examples of extremely suitable polyoxyalkyl ethers are polyoxyethylene ethers, such as polyethylene glycol, alkoxypolyethylene glycol, such as methoxypolyethylene glycol, and ethyleneoxide-propylenoxide copolymers. In other cases polyoxyalkyl esters are preferred on account of their low toxicity. A survey of non-ionic stabilizers is given by Helmut Stache and Kurt Kosswig in the Tensid-Taschenbuch, Carl Hanser Verlag Wien, 1990.

The dispersion of the first binder particles optionally is also stabilized by a minor amount of anionic stabilizers, cationic stabilisers and/or stabilizers containing both a non-ionic part and an ionic part. The non-ionic part preferably contains at least 10 carbon atoms. Examples of frequently used anionic stabilizers are alkylsulphates and alkylsulphonates, ethoxylated alkylsulphates, alkylsulphonates and alkylphosphates, ethoxylated alkylcarboxylic acids and alkylphenolcarboxylic acids, ethoxylated alkylphenolsulphates and alkylphenolsulphonates, sulphosuccinates and salts of carboxylic acid. Frequently used cationic stabilizers are primary, secondary, tertiary and quaternary ammonium salts, alkylpyridinium salts and acetylated polyamines.

Suitable non-ionic stabilizers usually have a weight average molecular weight of between 100 and 1,000,000, preferably between 500 and 5,000. A polymeric non-ionic stabilizer that is suitable for the invention usually consists of monomeric units containing 1–50 carbon atoms, preferably 1–20 carbon atoms. The polymeric non-ionic stabilizer optionally contains several units that contain different numbers of carbon atoms. An example of such a stabilizer is an ethyleneoxide-propyleneoxide copolymer.

The first binder and the non-ionic stabiliser can, in the form of a mixture, form part of the electrically conductive particles. Preferably the non-ionic stabilizer is chemically bound to the first binder. This can be effected by incorporating units of the non-ionic stabiliser in the binder by adding the non-ionic stabiliser during the polymerisation of the binder. It is also quite possible to graft the non-ionic stabilizer onto an already polymerized binder. The dispersion of binder particles usually contains between 1 and 35 wt. % non-ionic stabilizer, relative to the total weight of the binder and the stabilizer. This is preferably 5–25 wt. %.

The weight ratio of the electrically conductive polymer and the binder in the electrically charged particles may vary within a wide range. Usually this ratio will lie between 0.1:99.9 and 80:20, preferably between 0.1:99.9 and 40:60, more preferably between 10:90 and 25:75. It has however been found that some variation in the aforementioned weight ratio within the composition of the electrically charged particles or the use of several binders does not offer a solution for the desired anticorrosive effect under damp or wet conditions. Of essential importance for the effect of the invention is hence the presence of between 50 and 99 wt. % of a second binder, which second binder does not form part of the electrically conductive particles.

The aforementioned weight percentages are based on a coating dispersion from which the water—the dispersant—has been removed, to result in a dry substance. The weight percentages mentioned in the present application are understood to mean the weight percentages based on the dry substance.

The second binder can be chosen from the aforementioned group of suitable first binders. In this case the second binder may also consist of the same material as the first binder. Also if the second binder consists of the same material as the first binder, the second binder does not form part of the electrically conductive particles, but is present along with these particles in the dispersion.

The second binder preferably contains a non-ionic stabilizer. This makes it possible to omit the removal of the salts present in the water before the addition of the second binder during the preparation of the aqueous coating dispersion according to the invention. If the second binder contains an ionic stabilizer, then salts present in the dispersion containing electrically conductive particles must first be removed before an ionogenically stabilized binder is added, because otherwise the dispersion will become unstable and will flocculate. In all cases the aqueous coating dispersion according to the invention comprises a mixture of electrically conductive particles, comprising a first binder, with an electrically conductive polymer and a second binder which does not form part of the electrically conductive particles.

The invention also relates to a process for the preparation of an aqueous coating dispersion according to the invention. According to this process monomers are polymerized into an electrically conductive polymer in an aqueous solution, in the presence of a dispersion of a binder stabilized by means of a non-ionic stabilizer. This part of the process, in which the electrically conductive particles are prepared, is known and is extensively described in EP-A-589529. The aqueous coating dispersion according to the invention is obtained because a second binder consisting of electrically non-conductive particles is added after salts present in the aqueous dispersion of the electrically conductive polymer have been entirely or partly removed. Different techniques are available for the removal of the salts, including for example diafiltration and ultracentrifugation and dialysis.

Preferably, the salts present are removed by means of dialysis or diafiltration. That way the dispersion is not unnecessarily concentrated.

The invention also relates to the use of the aqueous coating dispersion according to the invention in an anticorrosive paint. For the preparation of such a paint 60 or even up to 90 wt. % fillers and/or antioxidants may optionally additionally be added to the mixture of electrically conductive polymer particles and the second binder. Examples of fillers that could be added are talc, barium sulphate, calcium carbonate, fibres, $SiO_2$, kaolin, wollastonite and glass, and (light-absorbing) pigments such as titanium white and coloured pigments like iron oxide. Adhesion promoters, flow-promoting agents, fillers, thickeners, surface improvers, antifoaming agents, anticorrosive agents, hardeners, drying agents, conductive materials, such as carbon black, conductive fibres and conductive flakes and stabilisers may also be added.

Such an anticorrosive paint is preferably used to protect metals like aluminium, copper or iron or alloys containing those metals. For these metals in particular the electrically conductive polymer acts as a protective layer of a precious metal.

The invention is further elucidated with reference to some examples:

EXAMPLE I

A solution was prepared of 4.86 grams of $FeCl_3$ (from Merck, free of water) in 21.25 grams of demineralized water (solution A). Then a solution was prepared of 0.89 grams of pyrrole (from Aldrich, vacuum distilled) in 19.34 grams of demineralized water (solution B).

At a temperature of 20° C. solution A was added, drop by drop, to 20 grams of a dispersion of polyurethane in water (Uraflex XP 401 UZ, DSM Resins, with a solids content of 40% and an average particle size of 60 nm, which had been stabilised by incorporating methoxypolyethylene glycol chains ($M_w$=750 g/mol). While the solution was added, the dispersion was stirred with the aid of a stirring bar and the temperature was kept at 20° C. The dispersion was yellowish green.

After 30 minutes' stirring solution B was then added, drop by drop, with stirring. After the addition of solution B the colour of the dispersion changed to dark green and then black.

After 20 hours' stirring at a temperature of 20° C. a portion of the dispersion was centrifuged for 30 minutes at a rate of 20000 rpm. Then the supernatant layer of water was poured off and the sediment (2.63 grams) was redispersed in 13.1 grams of demineralized water with the aid of an Ultra-Torrax T 25 (Janke & Kunkel JK Labortechnik) (solution C). Next, a 50 wt. % dispersion of Uramul SC341 from DSM Resins was added to the dispersion thus obtained (solution D), after which the mixture was homogenized for 5 minutes with the aid of the ultra-Torrax. With the aid of a coating knife, the homogenized mixture was applied to a standard steel plate (R-46 Q panel), after which it was cured for 10 minutes at 80° C. and conditioned for 1 week. Then two scratches were made on the plate, through the coating, with the aid of a Stanley knife. Next, the steel plate was for 3 days suspended in a 3.5% NaCl solution through which a constant stream of air was passed, after which it was visually inspected for signs of corrosion (see Table 1). This clearly shows that the addition of 50 to 99 wt. % of a second binder results in good protection against corrosion.

TABLE 1

| Solution C (wt. %) | Solution D (wt. %) | Corrosion |
|---|---|---|
| 0 | 100 | + |
| 5 | 95 | – |
| 10 | 90 | – |
| 20 | 80 | – |
| 30 | 70 | – |
| 40 | 60 | – |
| 50 | 50 | +/– |
| 60 | 40 | + |
| 70 | 30 | + |
| 80 | 20 | + |
| 90 | 10 | + |
| 100 | 0 | + |

Table 1

Protection against corrosion as a function of the amount of second binder in the coating dispersion (+: corrosion; –: no corrosion).

Comparative Experiment A 13.1 grams of solution C was prepared according to the method described for Experiment I. This was mixed with 13.1 grams of a dispersion of polyurethane in water (Uraflex ZB 2331, DSM Resins, with a solids content of 40%, stabilised by means of ionic carboxyl groups linked to the polyurethane chain. The dispersion became unstable and started to coagulate. It proved impossible to obtain a homogeneously distributed film with this dispersion.

EXAMPLE II 13.1 grams of solution C was prepared according to the method described for Experiment I. This solution was dialysed with demineralised water for 1 week, which resulted in the removal of almost all the salts. To this solution was then added 13.1 grams of a dispersion of polyurethane in water (Uraflex ZB 2331, DSM Resins, with a solids content of 40%, stabilized by means of ionic carboxyl groups linked to the polyurethane chain. The mixture was homogenized for 5 minutes with the aid of the ultra-Torrax. The homogenised mixture proved to be stable and did not coagulate. With the aid of a coating knife a portion of the stable mixture was applied to a standard steel plate (R-46 Q panel), after which it was cured for 10 minutes and dried at 80° C. and conditioned for 1 week. Next, two scratches were made on the plate, through the coating, with the aid of a Stanley knife. Then the steel plate was for 3 days suspended in a 3.5% NaCl solution, through which a constant stream of air was passed. No corrosion phenomena were observed in visual inspection.

Comparative Experiment B 13.1 grams of solution C was prepared according to the method described for Experiment I. This was mixed with 8.7 grams of a dispersion of an alkyd resin in water (Urasil Z310 from DSM Resins, with a solids content of 60 wt. % and an average particle size of 534 nm), stabilised by means of 2 wt. % sodiumdodecylbenzenesulphonate. The dispersion immediately became unstable.

EXAMPLE III 13.1 grams of solution C was prepared according to the method described for Experiment I. This solution was dialysed for 1 week, which resulted in the removal of almost all the salts. To this was then added 8.7 grams of a dispersion of an alkyd resin in water (Urasil Z310 from DSM Resins with a solids content of 60 wt. % and an average particle size of 534 nm), stabilized by means of 2 wt. % sodium dodecylbenzenesulphonate. The mixture was homogenized for 5 minutes with the aid of the ultra-Torrax. The homogenised mixture was found to be stable. With the aid of a coating knife a portion of the stable mixture was applied to a standard steel plate (R-46 Q panel), after which it was cured for 10 minutes and dried at 80° C. and conditioned for 1 week. Next, two scratches were made on the plate, through the coating, with the aid of a Stanley knife. Then the steel plate was for 3 days suspended in a 3.5% NaCl solution through which a constant flow of air was passed. No corrosion phenomena were observed in visual inspection.

What we claim is:

1. An aqueous coating dispersion containing
   electrically conductive particles, said particles containing at least a first binder, a conductive polymer and a non-ionic stabilizer; and
   50 to 99 wt. %, relative to the total amount of solids present, of a second binder, wherein said second binder does not form part of the electrically conductive particles.

2. An aqueous coating dispersion according to claim 1, wherein the second binder contains a non-ionic stabilizer.

3. An aqueous coating dispersion according to claim 1, wherein said second binder is non-conductive.

4. A process for preparing an aqueous coating dispersion comprising;
   preparing an electrically conductive polymer by polymerizing monomers, in the presence of an aqueous dispersion of a first binder stabilized by means of a non-ionic stabilizer in an aqueous solution;
   removing at least a portion of the salts present in the aqueous dispersion;
   adding a second binder in the form of electrically non-conductive particles.

5. A process according to claim 4, wherein at least a portion of the salts are removed through dialysis or diafiltration.

6. A process for preparing an anticorrosive paint comprising;
   combining an aqueous dispersion according to claim 1 or 2 with 60 to 90 wt. % of at least one of filler or antioxidant.

7. A process for protecting a metal substrate comprising applying an aqueous coating dispersion obtained according to claim 4 to said metal substrate.

8. An anticorrosive paint containing an aqueous coating dispersion according to claim 1 or claim 2.

9. A coating formed from an aqueous coating dispersion according to claim 1.

10. A metal substrate coated in whole or in part with a coating according to claim 9.

* * * * *